United States Patent

[11] 3,542,184

| | | |
|---|---|---|
| [72] | Inventor | Fredrick R. Ruckman,<br>82 Zenobia St., Denver, Colorado 80219 |
| [21] | Appl. No. | 726,011 |
| [22] | Filed | May 2, 1968 |
| [45] | Patented | Nov. 24, 1970 |

[54] CONVEYOR APPARATUS
13 Claims, 5 Drawing Figs.

[52] U.S. Cl. ............................................. 198/33,
198/190
[51] Int. Cl. ....................................... B65g 47/24
[50] Field of Search ...................................... 198/33(R3),
33(R4), 190, 187, 21, 25, 20, 34, 33

[56] References Cited
UNITED STATES PATENTS
1,674,419  6/1928  Titus ............................ 198/33(R3)

2,565,779  8/1951  Muddiman ................... 198/33(R4)
3,279,587  10/1966  Gray ............................ 198/190

Primary Examiner—Richard E. Aegerter
Attorney—Sheridan and Ross

ABSTRACT: A conveyor system for conveying and reorienting articles, including two moving conveyor beds in tandem having their support surfaces oriented linearly along their length to reorient articles carried on them, the conveyor beds comprised of two cooperating series of springs, each series made up of adjacent spaced-apart endless springs rotatably supported at their loop ends by supports mounted in substantially perpendicular planes so that each cooperating series comprises pairs of resilient strands forming a conveyor bed having a surface of a generally hyperbolic parabolic contour, and power means for rotating or revolving the strands.

INVENTOR
FREDRICK R. RUCKMAN
BY Sheridan and Ross
ATTORNEYS 3,542,184

CONVEYOR APPARATUS

SUMMARY OF THE INVENTION

This invention relates to a conveyor system for reorienting articles as they are conveyed, more particularly, it relates to a conveyor system utilizing resilient members as endless belts.

In packaging articles, such as, bakery and confectionary items, hand labor is required to orient or position the articles relative to each other so that they can be efficiently packaged. The use of hand labor is expensive and in this field requires the handling of edible articles by individuals, a practice that is not always sanitary.

The invention will be illustrated by its application to a conveying device for conveying and reorienting buns; however, it is not limited to this application.

It is an object of this invention to provide a conveyor system for reorienting articles as they pass from the production area to the packaging area so that efficient packaging can be effected.

It is an other object of the invention to provide a conveying system which is adaptable by suitable arrangement of parts to reorient articles to various required orientations with respect to each other.

Broadly, the above and other objects are accomplished by a conveyor system in which the conveyor means is comprised of cooperating series of endless resilient strands supported at their end loops by support members oriented in transverse planes so that the conveyor bed of each series is comprised of pairs of strands providing a support surface having a generally hyperbolic parabolic contour throughout its length. The orientation of cooperating series is adjusted to provide the final desired orientation of the articles conveyed with respect to each other.

The invention is best explained by reference to the accompanying drawings, hereby made a part of this specification, and in which.

Figure 1:
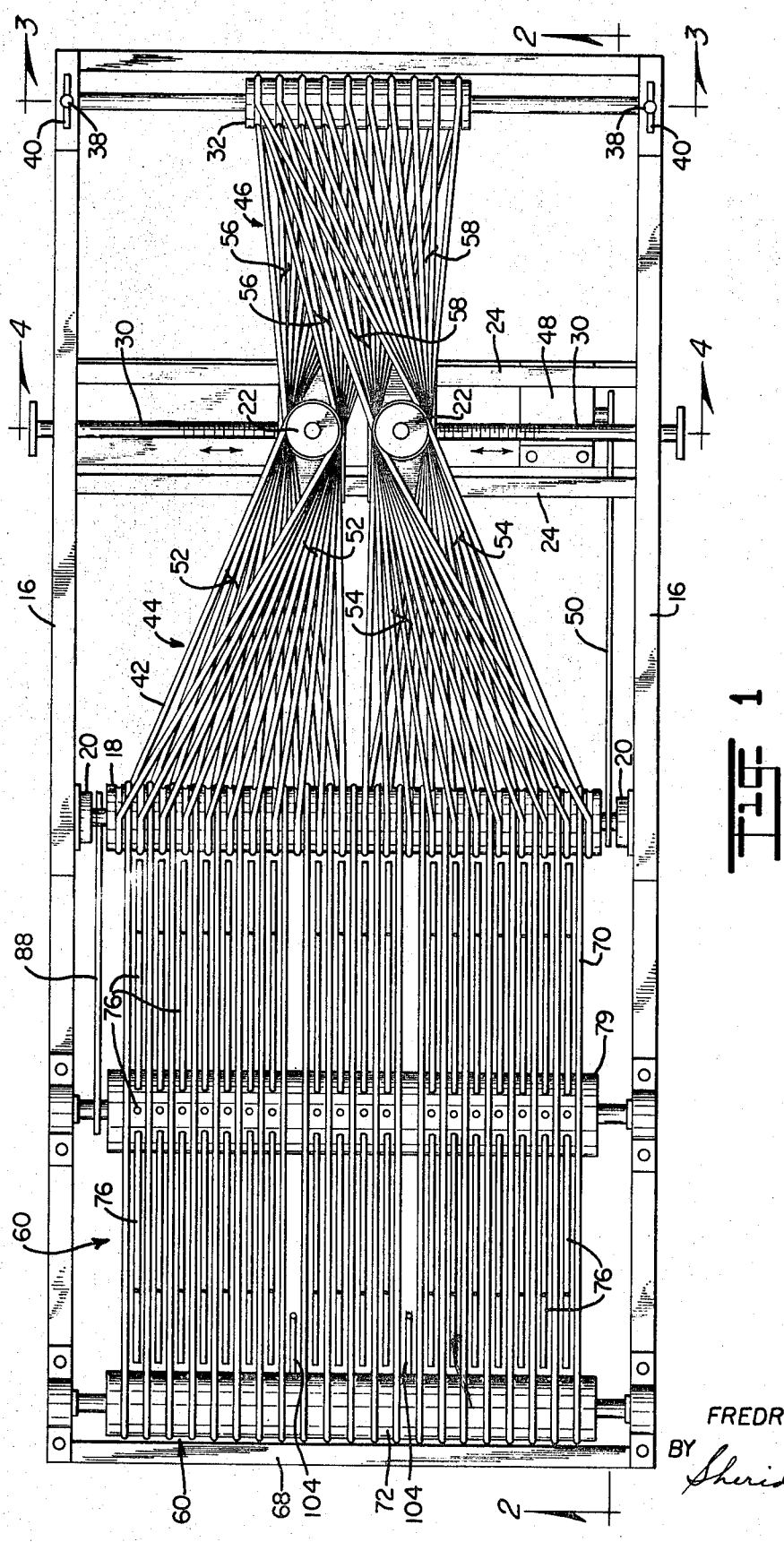
FIG. 1 is a top plan view of the conveyor system of the invention shown with an approach conveyor section for transporting articles to the conveyor system.
Figure 2:
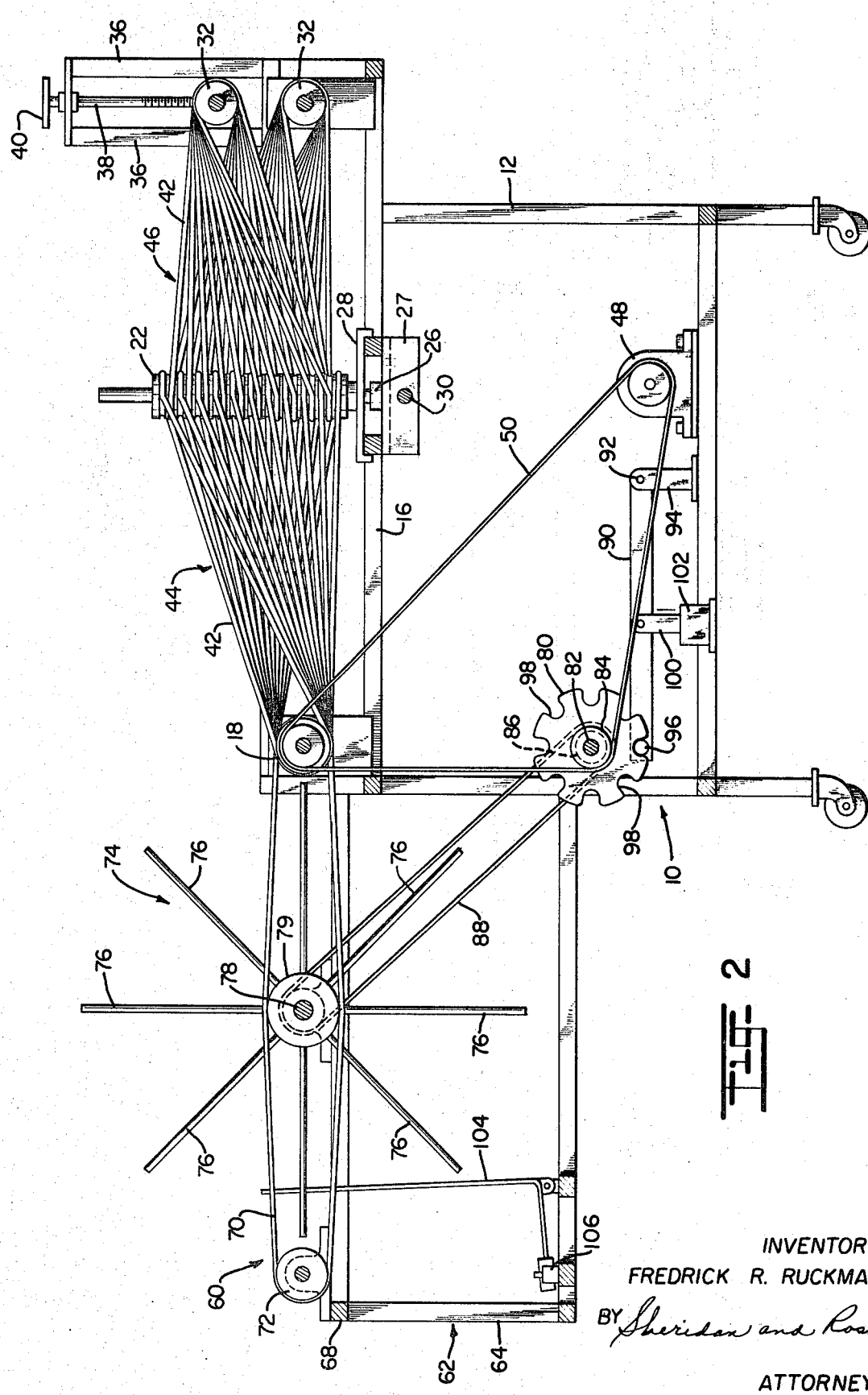
FIG. 2 is a partial side-elevational view taken on line 2-2 of FIG. 1.

Referring to the drawings, an open construction support frame is indicated by the numeral 10, and may be of any suitable type. In this instance it is constructed of end leg members connected together by horizontal and longitudinal side members. Two legs 12 and longitudinal connecting member 14, respectively, are shown in FIG. 2. Top connecting members 16 of the support frame are shown in FIGS. 1 and 2. Corresponding legs and connecting members completing the conventional frame structure are not shown.

Figure 4:
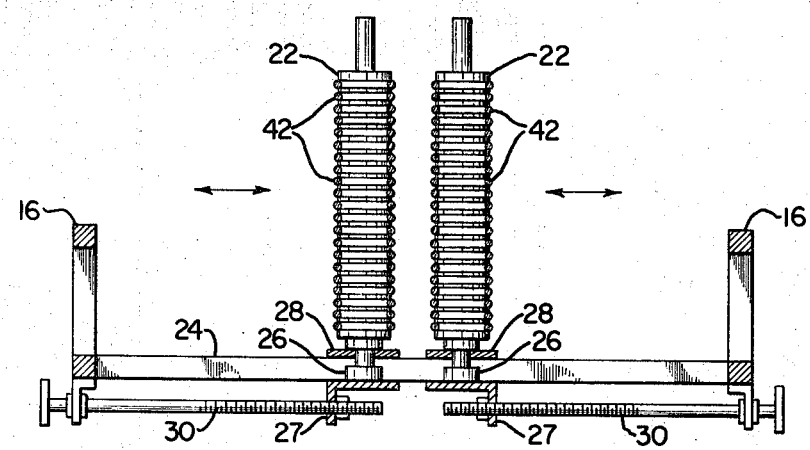
FIG. 4 is a view taken on line 4-4 of FIG. 1.

A grooved roller 18 is rotatably mounted between top connecting members 16 by means of suitable conventional bearing members 20. Two vertical grooved rollers 22 are rotatably mounted centrally of the top frame by means of horizontal spaced-apart cross bars 24. The rollers 22 are rotatably mounted in movable bearings 26 (FIG. 2) and are supported on slide platforms 28 (FIG. 4) which are free to move horizontally along the horizontal supports 24. The distance between the rollers 22 can be adjusted by means of adjusting screw threaded members 30 mounted on either side of the support frame threadedly connected through angle members 27 to movable bearing members 26.

Figure 3:
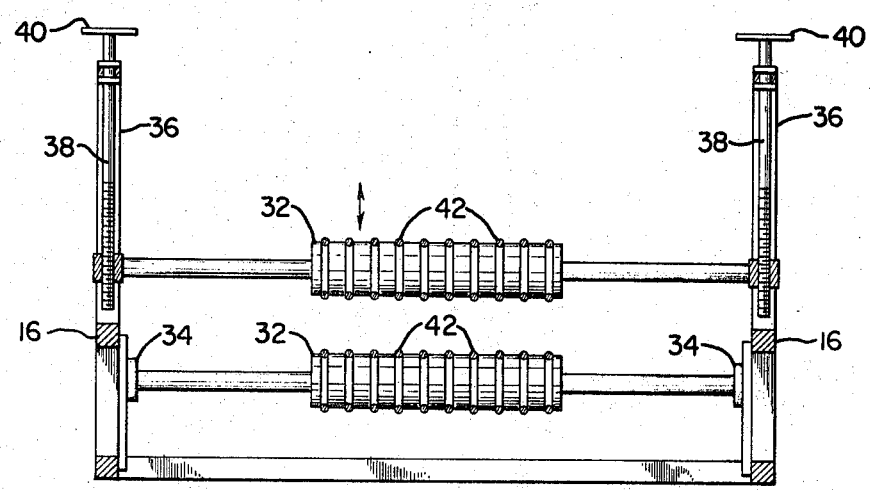
FIG. 3 is a view taken on line 3-3 of FIG. 1.

Two horizontal grooved rollers 32 are mounted at the other end of the support frame by use of suitable bearing members 34 as shown in FIG. 3. These rollers are mounted in horizontal alignment and the top roller is vertically adjustable along end support frame members 36 by means of adjustment screws 38 threadedly engaged with the ends of the shaft of roller 32 and operated by handles 40. In the modifications shown, the horizontal rollers are oriented with their long or support axes in a horizontal plane and the vertical rollers are oriented with their long or support axes in a vertical plane substantially perpendicular to that of the horizontal rollers; however, various relative orientations of the respective pairs of rollers may be used.

Forming the conveyor beds, endless spring members 42 are mounted in the grooves of horizontal rollers 18 and vertical rollers 22 to form the article folding conveyor bed of the conveyor system, and other endless springs 42 are mounted in the grooves of vertical rollers 22 and the horizontal rollers 32 to form the exit conveyor bed of the conveyor system. Horizontal roller 18 is power driven by a suitable motor 48 (FIG. 2) and drive belt 50. Due to the friction of springs 42 in the grooves of the rollers, when roller 18 is driven, the endless spring members 42 of folding section 44 rotate to, in turn, rotate vertical rollers 22 to, in turn, rotate spring members 42 in exit section 46 to rotate rollers 32 so that moving conveyor beds are formed of the continuously revolving spring members 42.

The strands 42 are endless springs so that they are entirely resilient. They may be made of other resilient material, such as, rubber, synthetic rubber, etc. It is necessary that the material of the strands be resilient so that the strands will revolve properly in the angled orientation in which they are mounted, and so that conveyor beds of the required configuration will be formed. The strands are rotatably supported by the support members or rollers 18, 22 and 32. In the modification shown, the strands 42 are rotatably supported on the rollers by passing around the rollers and being seated in the grooves in them. However, the strands may be rotatably supported by the support members 18, 22 and 32 by other means, such as, swiveled pulleys attached to the support members. Accordingly, the means for rotatably supporting the strands 42 on the support members 18, 22 and 32 is not limited to that shown.

The continuous strands are arranged on their respective support members in adjacent spaced-apart relationship so that each group of strands supported between two respective support members constitutes a series pair. For example, referring to FIG. 1, one series pair 52 is supported between one end of horizontal support member 18 and one vertical support member 22, another series pair 56 is supported between one vertical support 22 and lower horizontal support member 32, and a final series pair is supported between the other vertical support member 22 and upper horizontal support member 32. By this arrangement a conveyor bed is formed in article folding section 44 by the cooperating arrangement of the adjacent upper strand sections of series 52 and 54, and a conveyor bed is formed in exit section 46 between the adjacent strand sections of the strands of series 56 and 58.

The support of the strands at their respective loop ends on support members oriented in transverse planes results in the surfaces of the conveyor beds taking a generally hyperbolic parabolic shape between their ends. It can be roughly stated that the plane of the support surface of the conveyor beds varies from one end to the other through the angle between the planes of the two support members. Although the angle does not vary linearly or uniformly, it does vary throughout the angle between the planes of the support members.

In the modification shown and described to illustrate the invention, the horizontal and vertical support members for strands of the respective sections are oriented in planes which are substantially perpendicular; however, the angle between these planes is not limited to 90° and can vary over a wide range depending upon the reorientation required for articles being conveyed, and can thus vary from a small to a large value. It is only necessary that the support members be arranged in transverse planes so that the endless, spaced-apart resilient strands will form conveyor beds each having a support surface conforming generally to a hyperbolic parabolic shape along its length. By planes transverse to each other is meant planes in which the angle between them varies from 0 to 180° and the term is not restricted to a right angle. The spring members provide a friction surface to prevent relative movement between them and the articles supported on them.

In the modification described, the outer endless strand supported at each end of the support member 18 extends to the top of its respective vertical support members 22 and the strands positioned internally of these outer strands along support member 18 are supported at their other loop ends by the respective vertical support members 22 progressively downwardly from the top of the vertical support members. By this arrangement, a conveyor bed is formed which is horizontal at the entrance end over support member 18 and which diverges along its length in a substantially hyperbolic parabolic contour until it becomes vertical between the vertical support members 22.

Referring to the endless resilient strands in exit section 46, the strands at corresponding ends of the two horizontal rollers pass to corresponding ends, respectively, of the vertical rollers, that is, the strands on the left ends (facing the exit section 46) of horizontal rollers 32 pass, respectively, to the lower ends of vertical rollers 22, and strands on the right ends of the horizontal rollers 32 pass to the top ends of respective vertical rollers. This results in a conveyor bed between the upper and lower series 58 and 56, respectively, which diverges from a vertical orientation at the vertical rollers 22 in a substantially hyperbolic contour to a horizontal orientation between the horizontal rollers 32.

The above described modification of the conveyor system is one for a specific application to provide a required reorientation of buns; however, obviously, orientation of the respective horizontal and vertical support members in various planes can be used, as well as various arrangements of the resilient strands on the support members, to provide any reorientation of articles required as they are conveyed through the system to the packaging areas. In the modification described, two articles placed side by side on series 52 and 54 upon being carried forward will be positioned in juxtaposed vertical reorientation between rollers 22. Upon passing forward from rollers 22, the juxtaposed articles will travel along the conveyor bed between series 56 and 58, and while being maintained in juxtaposed position will be reoriented from the vertical to the horizontal position and pass out between horizontal rollers 32 in the same juxtaposed position in a horizontal plane. In the case of buns which come from the oven in groups of four the eight buns are delivered from the exit section in a group ready for packaging in a package of eight buns with four buns on top of four.

In order to align the articles which are to be reoriented in juxtaposed position in the conveyor system, an aligning and feeding mechanism preceding the folding section 44 must be used. The articles must be aligned horizontally before they enter the folding section, otherwise, they will not be juxtaposed evenly on top of each other by the conveyor system. The aligning and feeding section, referred to as the entrance section, is indicated generally at 60, and its construction is not critical, as any suitable aligning and feeding structure can be used.

Figure 5:
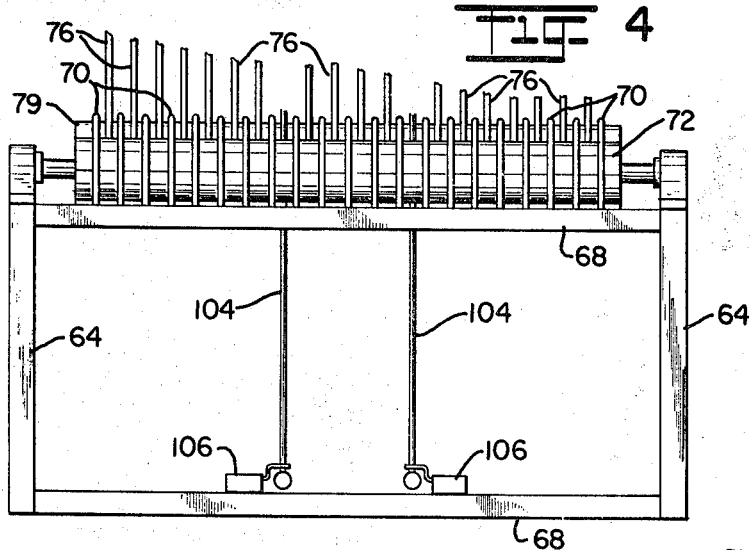
FIG. 5 is an end view of the approach section.

The entrance section 60 is comprised of a suitable open frame structure 62 mounted on the front end of frame 10 and including side support members 64 (FIG. 5), bottom support member 66 (FIG. 2), and end support members 68 (FIG. 5). Corresponding support members making up the frame 62 are not shown. A conveyor bed is formed on top of support frame 62 by individual belt or strand members 70 supported by their end loops on grooved rollers 72 and 18, the strands 70 being driven by power roller 18.

A star wheel 74 provided with rows of laterally aligned spokes 76 and having axle 78 is mounted on top of frame 62 and extends horizontally across the frame. The star wheel 74 is mounted in frame 62 so that the spokes 76 pass through the spaces between strands 70 as the star wheel rotates.

A cam wheel 80 provided with a drive pulley is mounted through slip clutch 86 on axle 82 which is driven by drive wheel 84 attached to the axle. Axle 82 is rotatably mounted on frame 10 by suitable bearing means. The slip clutch 86 of conventional construction is operatively connected between axle 82 and cam wheel 80 to permit relative motion between the cam wheel 80 and the axle 82. Drive belt 50 passes around drive wheel 84 and the drive wheel of motor 48 to drive axle 82, and cam wheel 80 through slip clutch 84. Drive belt 88 connects the drive pulley on cam wheel 80 with drive wheel 79 connected through an axle to star wheel 74. A cam follower 90 is hingedly supported at 92 on standard 94 and is provided with lock pin 96 fitting into notches 98 on cam wheel 80. Solenoid actuated pin 100 is connected to cam follower 90 at a central point as shown. The drive pin 100 is actuated by a solenoid of standard construction, located in case 102. With the arrangement described and with motor 48 running and driving belt 50 and pin 96 locking the cam wheel 80, roller 18 will be driven and, correspondingly, the strands of conveyor bed 70 with star wheel 74 held motionless.

For actuating solenoid 102 at the proper time, switch actuators 104 (FIG. 5) are provided and these switch actuators connected to microswitches 106 so that in the forward position of the switch actuators the microswitches are closed. The microswitches 106 are wired in series and are connected to actuate, in their forward position, solenoid 102 to move cam follower 90 downward to dislodge pin 96 from notch 98 to permit rotation of cam wheel 80 and thereby star wheel 74. Return of the actuators 104 to their rear position deactivates solenoid 102 to permit pin 96 to lock in the next notch of cam wheel 80 so that intermittent rotation is imparted to star wheel 74.

The operation of the complete assembly, including the feeding and aligning system 60 and the conveyor system, is as follows: When buns leave the baking area, they are connected together in groups of four, and as they are almost universally sold in groups of 8, it is necessary to fold one section of four on top of the other section. Buns in two sections of four each lying on their tops travel from the baking area to the conveyor bed 70 with one section of four buns located on each side of the bed 70 and not necessarily in lateral alinement The axle 82, cam wheel 80 and its pulley and, accordingly, star wheel 74, are locked in position by means of spring biased cam follower 90 and pin 96. Slip clutch 86 permits drive wheel 84 to continue turning to drive conveyor 70 and move the buns forwardly against a row of spokes and between two adjacent rows of spokes 76. Each section of the buns strikes a respective switch lever 104 and pushes it forward as the sections of buns travel forwardly with the conveyor bed 70. As the two sections of buns, which may be out of lateral alignment, strike the surface of the spokes 76 in the row ahead of them they become aligned laterally and the actuators 104 are correspondingly aligned laterally in the forward position, at which position they actuate the microswitches connected in series which in turn actuate solenoid 102 to retract cam follower 90 so that cam wheel 80 moves forwardly one notch and, correspondingly, star wheel 74 move forwardly a corresponding distance, with the row of spokes behind the buns pushing the two laterally aligned sections of buns forwardly onto folding section 44. As the microswitches 106 are connected in series, the solenoid 102 will not be actuated until the actuators 104 and, correspondingly, the two series of buns, are in lateral alignment.

When the buns pass over the ends of switch actuating levers 104, the spring biased levers retract to their original position, opening microswitches 106 and thereby deactivating solenoid 102 to permit spring-biased cam follower 90 to move upwardly and lock cam wheel 80 in the next notch, so that the aligning and feeding system is ready to receive, align and feed the next two roll sections into the system.

The two laterally aligned sections of rolls on folding section 44 are now lying on their tops. As the two aligned sections are conveyed forwardly through folding section 44, they are juxtaposed together in the vertical position between vertical support members 22 as explained above. They pass on through vertical sections 22 in vertical juxtaposed position and in passing along the conveyor bed in section 46, they are reoriented into a horizontal position while juxtaposed on one another. They pass out between exit rollers 32 to the bagging and sealing section where they are automatically bagged in groups of eight and sealed ready for sale.

It is to be understood that this invention is not limited to the exact embodiments of the method and apparatuses shown and described, which are merely by way of illustration and not limitation, as various other forms and modifications will be apparent to those skilled in the art, and it is therefore intended that the appended claims cover all such changes and modifications.

I claim:

1. A conveyor system comprising: at least a pair of spaced-apart first support members at one end of said conveyor system mounted with their long axes substantially parallel and in a first plane; at least a pair of spaced-apart second support members at the other end of said conveyor system mounted with their long axes substantially parallel in a second plane transverse to said first plane; at least two series of adjacent, spaced-apart, endless, resilient strands coacting to form a conveying means for articles, the strands of one series being rotatably supported at their respective end loops by one of said first support members and one of said second support members; the strands of the other series being rotatably supported at their respective end loops by the other of said first support member and the other of said second support members; and means for driving said endless strands.

2. The conveyor system of claim 1 in which said support members are rollers and said driving means is connected to at least one of said rollers.

3. The conveyor system of claim 1 in which said first support members are mounted with their long axes in a substantially vertical plane and said second support members are mounted with their long axes in a substantially horizontal plane.

4. The conveyor system of claim 3 in which said second support members are mounted one above the other and strands at corresponding ends of said second support members pass, respectively, to the bottoms and tops of corresponding first support members whereby an upper and a lower series of strands are formed between which articles are carried when said strands are driven.

5. A conveyor system comprising: at least a first support member having its long axis oriented in a first plane; at least a pair of spaced-apart second support members having their long axes oriented in a second plane transverse to said first plane; at least a pair of cooperating series of adjacent, spaced-apart, endless, resilient strands forming a conveyor bed for articles, each strand of both series rotatably supported at one of its end loops by said first support member, one series of said strands having each strand rotatably supported at its other end loop by one second support member, the other series of said strands having each strand supported at its other end loop by the other second support member, and means for driving said endless strands.

6. The conveyor system of claim 5 in which each outside strand of both series supported by said first support member is supported at respective corresponding ends of said second support members, and progressively spaced inner strands of both series supported at one of their loop ends by said first support member have their other loop ends correspondingly spaced distal from said respective corresponding ends.

7. The conveyor system of claim 6 in which said first support member is mounted with its long axis in a substantially horizontal plane and said second support members are mounted with their long axes in a substantially vertical plane.

8. A conveyor system comprising: at least two spaced-apart central first support members mounted with their long axes in a first plane; at least a second support member mounted on one side of said first support members with its long axis in a second plane transverse to said first plane; at least a pair of spaced-apart third support members mounted with their long axes substantially in said second plane; at least a first series of spaced-apart, endless, resilient strands on one side of said central support members forming a first conveyor bed for articles, all the strands of said first series rotatably supported at their end loops by said second support member, one group of strands of said first series having each strand rotatably supported at its other end loop by one first support member and another group of strands of said first series having each strand supported at its other end loop by the other first support member; at least a second and third series of spaced-apart, endless, resilient strands on the other side of said central support members forming a second conveyor bed, the strands of said second series being rotatably supported at their respective end loops by one of said first support members and one of said third support members; the strands of said third series being rotatably supported at their respective end loops by the other of said first support members and the other of said third support member; and means for driving said endless strands.

9. The conveyor system of claim 8 in which each outside strand supported by said second support member is supported at respective corresponding ends of said first support members, and progressively spaced inner strands of said first series supported at one of their loop ends by said second support member have their other loop ends correspondingly spaced distal from said respective corresponding ends, said third support members are mounted one above the other and strands at corresponding ends of said third support members pass, respectively, to the bottoms and tops of corresponding first support members whereby an upper and lower series of strands are formed between which articles are carried when said strands are driven.

10. The conveyor system of claim 9 including means preceding said second support means for laterally aligning articles before they reach said first conveyor bed and for feeding said laterally aligned articles onto said first conveyor bed.

11. The conveyor system of claim 10 in which said aligning and feeding means includes a movable conveyor bed of spaced apart strands; at least one star wheel having its spokes movable between said strands; at least two switches in series actuatable by articles moving with said moving conveyor bed; a cam wheel controlled by a slip clutch for operating said star wheel; a cam follower for cyclically locking and unlocking said cam wheel; power means for operating said cam wheel; switch actuating means for each of said switches; said switches when both actuated being operative to actuate said cam follower to release said cam wheel and, correspondingly, said star wheel for rotation cyclically to move articles onto said first conveyor bed.

12. The conveyor system of claim 9 in which said support members are grooved rollers and said strands are seated in the grooves of the respective rollers which support them.

13. Article aligning and feeding means comprising: a movable conveyor bed including spaced apart belts or strands; at least one star wheel mounted so that its spokes rotate between said strands; driving means for intermittently rotating said star wheel upon lateral alignment of articles on said conveyor bed including means actuated by said articles when in laterally aligned position for activating said driving means.